United States Patent
Ramakrishnan

(10) Patent No.: US 7,475,068 B2
(45) Date of Patent: Jan. 6, 2009

(54) GLOBALLY OPTIMAL AND GREEDY HEURISTICS BASED APPROACH TO ACCESS STRUCTURE SELECTION

(75) Inventor: Srinivasan Ramakrishnan, Nashua, NH (US)

(73) Assignee: Oracle International Corp., Redwood Shores, CA (US)

( * ) Notice: Subject to any disclaimer, the term of this patent is extended or adjusted under 35 U.S.C. 154(b) by 450 days.

(21) Appl. No.: 11/266,530

(22) Filed: Nov. 3, 2005

(65) Prior Publication Data
US 2007/0083502 A1    Apr. 12, 2007

Related U.S. Application Data

(60) Provisional application No. 60/724,985, filed on Oct. 7, 2005.

(51) Int. Cl.
*G06F 7/00* (2006.01)
*G06F 17/30* (2006.01)
(52) U.S. Cl. .......................................... 707/5; 707/101
(58) Field of Classification Search ................ 707/3, 707/4, 5, 101; 717/151
See application file for complete search history.

(56) References Cited

U.S. PATENT DOCUMENTS

2005/0187917 A1 *    8/2005    Lawande et al. ............... 707/3

\* cited by examiner

*Primary Examiner*—James K Trujillo
*Assistant Examiner*—Bruce M Moser
(74) *Attorney, Agent, or Firm*—Kraguljac & Kalnay, LLC

(57) ABSTRACT

Systems, methods, and other embodiments associated with selecting access structures to support database queries are described. One exemplary method includes identifying basic configuration(s) of access structures and computing a net benefit for a configuration resulting from using these basic configurations. The method may include associating with a query a candidate basic configuration(s) selected from the basic configurations based on the net benefits computed for the basic configurations. The method may include associating the basic configuration having the lowest execution cost with the query and selectively replacing the basic configuration based on a shared cost(s). Example methods may use heuristics that synergistically cooperate to process complex workloads and to facilitate finding high-quality, low-cost configurations in both constrained-storage and non-constrained-storage cases.

25 Claims, 7 Drawing Sheets

GLOBALLY OPTIMAL AND GREEDY HEURISTICS BASED APPROACH TO ACCESS STRUCTURE SELECTION

This application claims benefit of application Ser. No. 60/724,985 filed Oct. 7, 2005.

BACKGROUND

Improving database performance is an ongoing issue for database administrators. One performance improvement technique concerns improving query response time. Query response time may be improved by different techniques including, for example, optimizing queries, creating indexes, creating summaries, and so on. Appropriate use of indexes can improve access paths to data and thus can improve query performance. For example, an appropriate index can enhance SQL (structured query language) statement performance by reducing the need for full table scans. However, indexes may be costly. Creating an index consumes processor cycles, storing an index consumes memory, storing an index consumed disk space, and maintaining (e.g., updating) an index consumes processor cycles. Thus, a database administrator (dbadmin) may carefully consider which indexes to create, store, and/or maintain.

Making decisions concerning indexes is complicated by the realities of the database environment. For example, dbadmins may have limited resources (e.g., memory, time, processor cycles, disk space) available. Therefore a dbadmin may not be able to create an unlimited or even large number of indexes, materialized views, and so on. By way of illustration, the dbadmin may not have enough memory to store all possible indexes that would improve query performance. Similarly, the dbadmin may not have enough processor cycles to maintain all possible indexes that would improve query performance. Thus, a dbadmin may be forced to select indexes to create and maintain.

Automated tools may help the dbadmin. Conventionally, an automated tool may generate candidate access structures (e.g., indexes, materialized views, summaries) from which a dbadmin may select. Additionally, an automated tool may provide candidate access structures to abandon. These decisions may be based, for example, on constraints like memory consumed, processor cycles consumed, disk space consumed, and so on. However, considering access structure costs and/or benefits in isolation may provide a sub-optimal solution for selecting access structures to create, maintain, and/or abandon.

BRIEF DESCRIPTION OF THE DRAWINGS

The accompanying drawings, which are incorporated in and constitute a part of the specification, illustrate various example systems, methods, and other example embodiments of various aspects of the invention. It will be appreciated that the illustrated element boundaries (e.g., boxes, groups of boxes, or other shapes) in the figures represent one example of the boundaries. One of ordinary skill in the art will appreciate that one element may be designed as multiple elements or that multiple elements may be designed as one element. An element shown as an internal component of another element may be implemented as an external component and vice versa. Furthermore, elements may not be drawn to scale.

DETAILED DESCRIPTION

Figure 1:
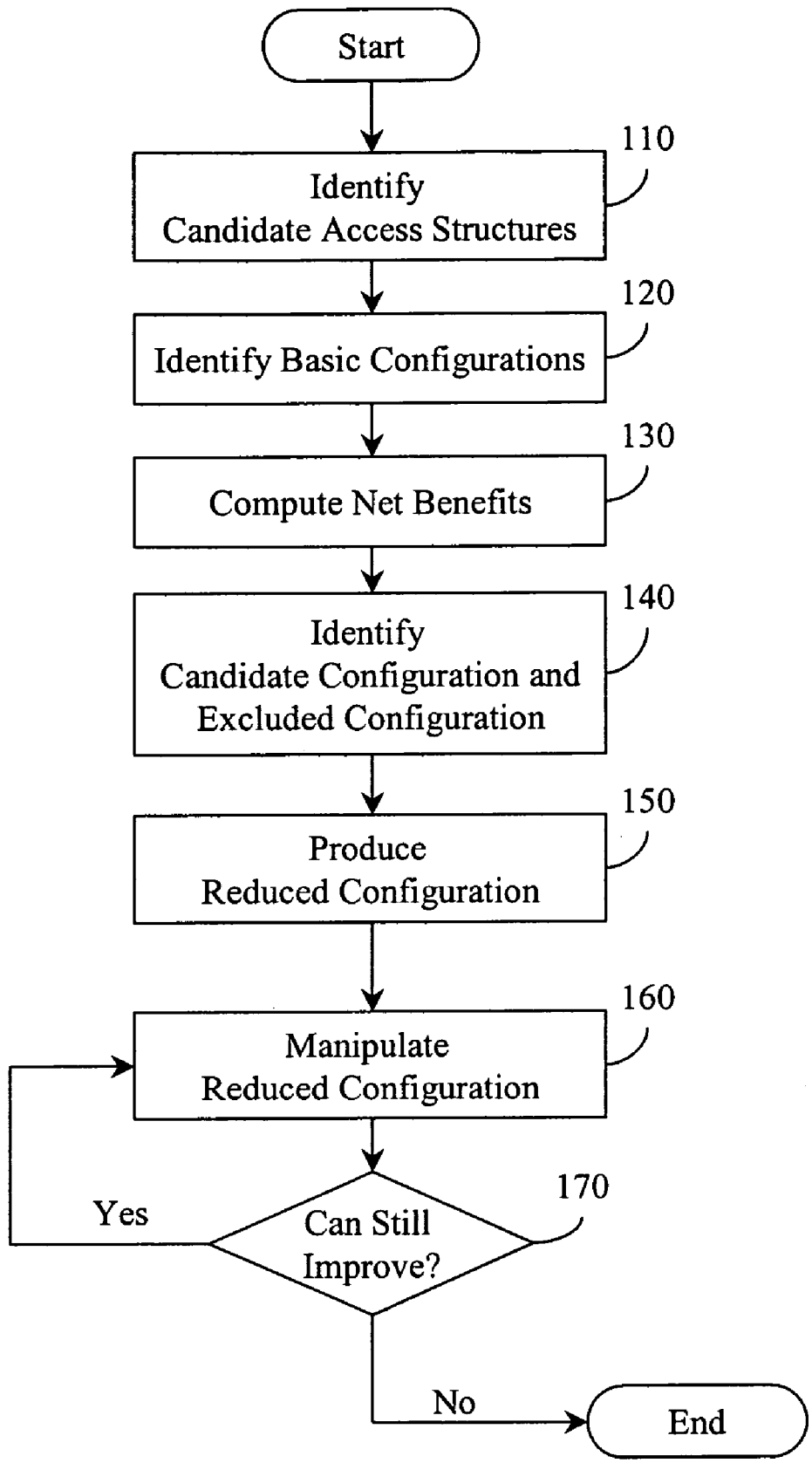
FIG. 1 illustrates an example method associated with selecting access structures.

Example systems and methods described herein concern selecting access structures for use with a database. The access structures may include, for example, indexes, materialized views, and so on. Generally, the fastest way to access a database is with an index. Indexes may include, for example, bitmap indexes, b-tree indexes, and so on. An index includes an entry for each value that appears in an indexed column of a table and a pointer that provides direct access to a row(s) in that table. Good b-tree index performance may depend on building indexes on columns having good selectivity, which facilitates quickly bypassing rows that do not match search criteria. Good bitmap index performance may depend on building indexes on columns having poor selectivity. These differences facilitate understanding, at least in part, why index selection can be difficult and costly.

A summary may store a pre-computed result (e.g., sum, count, average, join) associated with a table and/or sets of tables. When a value like a sum is sought in a query, the summary may be accessed rather than scanning an entire table in real time to compute the result. Materialized views may similarly store pre-computed results. Pre-computing results associated with summaries and/or materialized views consumes processor cycles. Keeping the results up to date consumes processor cycles. Storing the results consumes memory and/or disk space. Thus, the costs as well as the benefits of an access structure may need to be considered.

The costs and benefits may be evaluated in light of actual work being performed with the database. This work may include responding to queries. A set of planned and/or available queries may be known for a database. Similarly, a set of ad hoc queries made against the database may be recorded. Additionally, database designers may have consulted with users and thus may anticipate the types of queries users may make. Therefore, a set of queries associated with a database may be known. The set of queries may be referred to as a workload. The costs and benefits of access structures to improve database performance may be made in light of this workload. The workload may be actual and or hypothetical. A database may be accessed by different workloads at different times. Thus, access structure costs and benefits may be analyzed in light of different workloads available at different times.

A set of access structures employed to improve performance for a set of queries may be referred to as a configuration. A subset of access structures employed to improve performance for a single query may be referred to as a basic configuration. Thus, a configuration may include many basic configurations. The overall cost for a configuration may be determined by analyzing the individual cost for each basic configuration. Thus, the addition or subtraction of a basic configuration may be analyzed in light of its impact on the overall configuration. This impact may be positive or negative, which leads to the concept of a net benefit.

As a first access structure and/or basic configuration selection action, a set of candidate access structures that may improve query performance are generated. Example systems and methods may then select a subset of the set of candidate access structures to employ. In one example, the subset may be selected to minimize a cost function while satisfying constraints like memory consumed, processor cycles consumed, disk space consumed, and so on. The cost function may have components that include, for example, execution costs, creation costs, maintenance costs, and so on.

Conventionally, given a set of candidate access structures, the problem of minimizing a cost function while satisfying constraints was an NP-complete problem that required an exhaustive search of all possible combinations to achieve the optimal solution. However, exhaustive searches are prohibitively expensive in terms of processor cycles, wall clock time, and memory consumed. Thus, some conventional approaches may have employed a divide and conquer algorithm that evaluated queries in isolation based on individual costs. However, these conventional approaches may have produced suboptimal solutions.

Example systems and methods described herein take a different approach based on a net benefit analysis. The net benefit analysis considers the selection of an access structure as a tradeoff between improving query performance and consuming resources (e.g., memory, processor cycles, disk space) to create and/or maintain an access structure and/or set of access structures (e.g., basic configuration). For example, a first access structure that improves query performance by a first amount while consuming a first set of resources may be selected over a second access structure that improves query performance by a second lesser amount while consuming a second greater amount of resources. Similarly, a first basic configuration that improves query performance by a first amount while consuming a first amount of resources may be selected over a second basic configuration that improves query performance by a second lesser amount while consuming a second greater amount of resources. However, selection may not be so straightforward. Thus, access structures and/or basic configurations may be considered and added/dropped during various selection cycles and/or actions.

Net benefit may be examined initially from a first "standalone" point of view where no basic configurations have been selected and then subsequently from a second "in-context" point of view where some basic configurations have tentatively been selected. Additionally, net benefit may be examined in light of user supplied constraints (e.g., available memory). Thus, a basic configuration that is initially selected may subsequently be dropped and a basic configuration that was not initially selected may be added.

By way of illustration, a basic configuration whose net benefit was initially thought to be too small to warrant inclusion may be included later when examined in the context of other included basic configurations. For example, a previously excluded basic configuration may share some costs with different included basic configurations. Thus, the costs to create and/or maintain the excluded basic configurations may be spread among included sets of basic configurations, which may reduce the cost and therefore increase the net benefit when viewed in context.

By way of further illustration, a basic configuration whose net benefit was initially thought to be great enough to warrant inclusion may be excluded when examined in the context of user supplied constraints. For example, a first basic configuration with a first net benefit may consume a first percentage of user constrained resources. A second basic configuration with a slightly lower net benefit may consume a second, much smaller percentage of user constrained resources. Thus, the first basic configuration may initially have been included but subsequently replaced with the second basic configuration.

The following includes definitions of selected terms employed herein. The definitions include various examples and/or forms of components that fall within the scope of a term and that may be used for implementation. The examples are not intended to be limiting. Both singular and plural forms of terms may be within the definitions.

"Computer-readable medium", as used herein, refers to a medium that participates in directly or indirectly providing instructions and/or data. A computer-readable medium may take forms, including, but not limited to, nonvolatile media, and volatile media. Non-volatile media may include, for example, optical or magnetic disks and so on. Volatile media may include, for example, semiconductor memories, dynamic memory and the like. Common forms of a computer-readable medium include, but are not limited to, a floppy disk, a flexible disk, a hard disk, a magnetic tape, other magnetic medium, a CD-ROM, other optical medium, a RAM, a ROM, an EPROM, a FLASH-EPROM, or other memory chip or card, a memory stick, and other media from which a computer, a processor or other electronic device can read. Other forms may also be used.

"Logic", as used herein, includes but is not limited to hardware, firmware, software and/or combinations of each to perform a function(s) or an action(s), and/or to cause a function or action from another logic, method, and/or system. For example, based on a desired application or needs, logic may include a software controlled microprocessor, discrete logic including an application specific integrated circuit (ASIC), an analog circuit, a digital circuit, a programmed logic device, a memory device containing instructions, and so on. Logic may include one or more gates, combinations of gates, or other circuit components. Logic may also be fully embodied as software. Where multiple logical logics are described, it may be possible to incorporate the multiple logical logics into one physical logic. Similarly, where a single logical logic is described, it may be possible to distribute that single logical logic between multiple physical logics.

An "operable connection", or a connection by which entities are "operably connected", is one in which signals, physical communications, and/or logical communications may be sent and/or received. Typically, an operable connection includes a physical interface, an electrical interface, and/or a data interface, but it is to be noted that an operable connection may include differing combinations of these or other types of connections sufficient to allow operable control. For example, two entities can be operably connected by being able to communicate signals to each other directly or through one or more intermediate entities like a processor, operating system, a logic, software, or other entity. Logical and/or physical communication channels can be used to create an operable connection.

"Signal", as used herein, includes but is not limited to one or more electrical or optical signals, analog or digital signals, data, one or more computer or processor instructions, messages, a bit or bit stream, or other means that can be received, transmitted and/or detected.

"Software", as used herein, includes but is not limited to, one or more computer or processor instructions that can be read, interpreted, compiled, and/or executed and that cause a computer, processor, or other electronic device to perform functions, actions and/or behave in a desired manner. The instructions may be embodied in various forms including routines, algorithms, modules, methods, threads, and/or programs including separate applications or code from dynamically linked libraries. Software may also be implemented in a variety of executable and/or loadable forms including, but not limited to, a stand-alone program, a function call (local and/or remote), a servelet, an applet, instructions stored in a memory, part of an operating system or other types of executable instructions. It will be appreciated by one of ordinary skill in the art that the form of software may depend, for example, on requirements of a desired application, on the environment in which it runs, and/or on the desires of a designer/programmer and so on. It will also be appreciated that computer-readable and/or executable instructions can be located in one logic and/or distributed between two or more communicating, co-operating, and/or parallel processing logics and thus can be loaded and/or executed in serial, parallel, massively parallel and other manners.

Suitable software for implementing the various components of the example systems and methods described herein may be fabricated from programming languages and tools including Java, Pascal, C#, C++, C, CGI, Perl, SQL, APIs, SDKs, assembly, firmware, microcode, and/or other languages and tools. Software, whether an entire system or a component of a system, may be embodied as an article of manufacture and maintained or provided as part of a computer-readable medium as defined previously. Another form of the software may include signals that transmit program code of the software to a recipient over a network or other communication medium.

It has proven convenient at times, principally for reasons of common usage, to refer to these signals as bits, values, elements, symbols, characters, terms, numbers, or the like. It should be borne in mind, however, that these and similar terms are to be associated with the appropriate physical quantities and are merely convenient labels applied to these quantities. Unless specifically stated otherwise, it is appreciated that throughout the description, terms like processing, computing, calculating, determining, displaying, or the like, refer to actions and processes of a computer system, logic, processor, or similar electronic device that manipulates and transforms data represented as physical (electronic) quantities.

"User", as used herein, includes but is not limited to one or more persons, software, computers or other devices, or combinations of these.

Example methods may be better appreciated with reference to flow diagrams. While for purposes of simplicity of explanation, the illustrated methods are shown and described as a series of blocks, it is to be appreciated that the methods are not limited by the order of the blocks, as some blocks can occur in different orders and/or concurrently with other blocks from that shown and described. Moreover, less than all the illustrated blocks may be required to implement an example method. Blocks may be combined or separated into multiple components. Furthermore, additional and/or alternative methods can employ additional, not illustrated blocks. While the figures illustrate various actions occurring in serial, it is to be appreciated that various actions could occur concurrently, substantially in parallel, and/or at substantially different points in time.

Access structures include indexes and materialized views. An access structure has two characteristics that example systems and methods consider: the cost of creating the access structure and the cost of maintaining the access structure when data in an underlying tables changes. An access-structure may be an existing access structure or a new access structure. A new access-structure does not exist in the database system and thus may be discovered by an automated tool (e.g., Access Advisor) during automated tool analysis. An existing access-structure is already present in a database system and is used by a query(s) in the workload. Since it already exists, the creation-cost for an existing access-structures is zero, whereas the creation-cost for a new access-structures is non-zero.

A basic configuration (bsc) is a set of access structures, all of which are used in executing some query in the workload. A configuration is a set of basic configurations. One or more basic configurations may be associated with a query. Each query-bsc association has query execution cost (qec), which is the execution cost of the query using the access structures that form the associated bsc. Like a query may be associated with more than one bsc, a bsc may be associated with more than one query.

Queries have an initial execution cost, which is the cost of executing the query using only the existing access structures in a database system. The set of access structures used by a query is designated as the query's initial bsc. Note a query's initial bsc may be an empty set. The initial configuration is defined as the set of all the initial basic configurations for all the queries that form the workload.

There is a m:n (many-to-many) relationship between queries and basic configurations. This many to many relationship can be represented by a bipartite graph with the edges linking the two sets, the queries and the basic configurations. An edge linking a query and a bsc stores the execution cost of the query using that bsc.

Similarly, there is a m:n (many-to-many) relationship between basic configurations and access-structures. This many to many relationship can also be represented by a bipartite graph with the edges linking the two sets, the basic configurations and the access structures. An edge linking a bsc and an access structure does not contain any additional information; its presence is merely to establish an association between the two entities.

One automated tool that is used to select access structures may be referred to as an Access Structure Advisor. The automated tool may be tasked with choosing a configuration (e.g., set of basic configurations) having a lowest overall cost. The cost of a configuration C may be defined as:

$$\mathrm{Cost}(C) = \mathrm{Exe}(C) + W1 * \mathrm{Cre}(C) + W2 * \mathrm{Maint}(C)$$

where:

Exe(C) is the sum-total of the execution-costs of the queries in the workload using the basic configurations in configuration C;

Cre(C) is the creation-cost of the access-structures forming the basic configurations in configuration C;

Maint(C) is the maintenance-cost of the access-structures forming the basic configurations in configuration C; and W1, W2 are the weighting-factors of the creation costs and maintenance costs with respect to the execution cost.

Given these definitions, the cost of an initial-configuration (IC) may be computed according to:

$$\mathrm{Cost}(IC) = \mathrm{Exe}(IC) + W2 * \mathrm{Maint}(IC)$$

where:

Exe(IC) is the sum-total of the execution costs of the queries in the workload using the basic configurations in initial configuration IC; and Maint(IC) is the maintenance cost of the access-structures forming the basic configuration in initial configuration IC.

Note that the creation cost term has been set to zero, because, by definition, access structures in the initial configuration are existing, with zero creation-cost.

It follows from the above definitions that in order to select a configuration with a lower cost than the initial configuration, there will need to be a tradeoff between the increased costs arising from the new basic configurations and the improvements in execution costs that arise from deploying them. This motivates the concept of the "net benefit" of a bsc B with respect to a configuration C, defined as:

$$\text{Netben}(B, C) = \text{Cost}(C) - \text{Cost}(C')$$

where C'=configuration C with basic configuration B added to it. Notice the cost C'of the new configuration must be lower than the cost of C for the netbenefit to be positive.

The initial netbenefit of a bsc B may be defined as:

$$\text{InitialNetben}(B) == \text{Netben}(B, IC) = \text{Sum}(iqec - qec(B)) - W1 * \text{Creat}(B) - W2 * \text{Maint}(B)$$

where the first term represents the net execution cost improvement of B. Thus, the first term is the sum of the improvement in the execution costs of all the queries associated with bsc B. Note that the improvement is the difference between the initial query execution cost and the query execution cost when employing bsc B. The second and third terms are the creation costs and the maintenance costs associated with the access structures for bsc B. Since these terms are negative, they will offset the execution-cost improvement. With this preliminary information in hand, example systems and methods for selecting access structures may now be examined.

Example systems and methods employ an optimal global greedy algorithm with heuristics based on global decisions using a greedy paradigm. Additionally, example systems and methods exploit a "separation of concerns" approach to software construction. Net benefit facilitates viewing the optimal access structure selection as occurring in two distinct phases. In a first phase, the best basic configurations are selected from a net benefit viewpoint to yield a set of "good basic configurations." In a second phase, basic configurations are selected from the set of "good basic configurations" using a greedy algorithm based solely on improving the execution cost of the workload.

Various elements (e.g., functions, data structures, program flow) of one example globally optimal and greedy heuristics based approach to access structure selection are described below. The approach is referred to as the Optimal Global Greedy (OptGG) approach. OptGG is based on a set of heuristics that facilitate processing large, complex workloads. The heuristics work synergistically and facilitate scaling the approach. OptGG yields a lowest-cost configuration faster than conventional methods.

Early in the OptGG approach an optimal superset is constructed. The optimal superset separates the basic configurations into two categories, "good" basic configurations and "bad" basic configurations. "Bad" bscs are removed from subsequent consideration in the algorithm. Thus, to make the algorithm resilient and to ensure that a bsc is not unfairly labeled "bad" and thus dropped from consideration, in one example the OptGG approach can be performed three different times with three different starting points and a winner can be selected from the three different results. Each starting point is configured to use a different method to compute the initial net benefit of basic configurations. This heuristic may be called a cost sharing heuristic. The three different methods are referred to in the example methods as FULL, SHARED and ZERO.

In the FULL level, each bsc is fully charged for creation and maintenance costs for access structures it contains, even though this access-structure may be shared across basic configurations. In the ZERO level, a bsc is not charged for creation/maintenance costs of its shared access structures. In the SHARED level, the creation/maintenance costs of the shared access structures are split evenly across sharing basic configurations.

In one example, an OptGG driver program may run OptGG with the cost sharing level=FULL, run OptGG with the cost sharing level=ZERO, run OptGG with the cost sharing level=SHARED, and then pick the lowest cost configuration from the three runs as the final configuration.

Different heuristics facilitate scaling the application based, at least in part, on the methods for computing net benefit. For example, a scalable method computes net benefit. This method is based on the definition of the net benefit by the equation:

$$\text{Netben}(B, C) = \text{Cost}(C) - \text{Cost}(C')$$

where B denotes a bsc,
C denotes the base-configuration, and
C' denotes the base configuration with B added to it.

Evaluating basic configurations uses an evaluate global configuration function as a primitive to compute the cost of the configuration. This function may be computationally expensive if allowed to loop over all queries in the workload. To improve scalability, netbenefit may be computed more efficiently. In this example, an incremental evaluation of net benefit is made by visiting only queries that are affected by adding a new bsc. Representative functions, data structures, and program flow are described below.

Evaluate Incremental Net Benefit inputs an input configuration and a bsc to add to the configuration. It outputs the net benefit of the bsc with respect to the configuration. (e.g., curgc.adjcost−(curgc+B).adjcost). Thus, the netbenefit may equal an improvement in execution cost of newgc over curgc+ cost savings by dropping del_acgs−costs incurred by adding new_acgs. The function may incur a small overhead to the configuration data-structure, a new field called bsc_usage_ count that keeps track of how often a bsc has been referenced by the configuration in answering queries using that configuration. The new field can be implemented by an array of integers, with each element storing a reference-count of the basic configurations usage in that particular configuration. The processing may include: (1) computing new_acgs as all the access-structures of B, computing new basic configurations, computing the improvement in execution cost of new bscs on a configuration and getting cost savings of the deleted bscs.

Add_Phase is used to add basic configurations in the storage constraint case. It may input curgc, the input configuration, and a storage limit. It may output a set of basic configurations that satisfies storage constraints and the cost of this configuration. It may invoke AddBest in a loop until no further improvement is possible to the configuration.

Add_Best adds multiple basic configurations in a single shot. It may input the current configuration, a storage limit, and a set of unavailable bscs. It may output a set of basic configurations that satisfies the storage-constraint and the cost of the configuration. It may include processing like, forming a candidate pool, getting the incremental net benefit of adding a bsc to a current configuration, selectively adding a bsc to the unavailable bscs, and selectively adding a bsc to a candidate pool. Additionally, it may rank the bscs in the candidate-pool in descending order of their net benefit and store them in a structure (e.g., RankedCandidatePool). During a selection round, basic configurations from the candidate pool get added one at a time to the updated configuration and their actual netbenefit gets evaluated using the Evaluate_Global_Config function. If it meets the expected benefit value, the nit may get picked.

OPTgg_Main may be the main entry point for the OptGG algorithm. It may input a storage limit and may output a set of basic configurations. It may perform optimal superset computation including computing a base_config, a set of "good" basic configurations. It may evaluate base_config in two modes, normal and rankbased using Evaluate_Global_Dual_Mode algorithm, which chooses a subset of the basic configurations in base config, and returns the subset in a reduced-configuration called red_config.

Compute_Optimal_Super_Set performs optimal superset computation. It may have no inputs and may output the set of all basic configurations with non-negative benefit and a structure (e.g., RankedBscVector) that describes basic configurations ranked in descending order of net benefit. It may compute the initial-net benefits of all the basic configurations, rank the basic configurations in descending order of their net benefits, and store ranked basic configurations in RankedBscVector.

Eval_Bscs is used to evaluate negative net benefit bscs. It may input a basic configuration (base_config) and output a new net benefit of remaining negative benefit basic configs in RankedBscVector. This function evaluates the "remaining negative benefit" basic configurations with respect to the base_config. This function does the evaluations for all rounds after an initial round (e.g., round=0, in which we used the initial-netbenefit). New net benefits of the basic configurations are computed by adding them one at a time to the base_config, and evaluating the resulting new configuration. The difference in costs of old and new configs is the new netbenefit of basic configuration.

Evaluate_Global_Config performs global evaluation of configurations. It inputs in_config, a set of basic configurations, and a mode (e.g., NORMAL or RANKBASED). It outputs out_config, a configuration, and adjcost, the adjusted-cost of the out_config. For each query Q in a workload, in NORMAL mode, pick lowest-cost execution-cost (L) bsc (B) for Q in in_config, in RANKBASED mode, pick highest-ranked execution-cost (L) bsc (B) for Q in in_config, compute maintenance and creation-costs of out_config.

Evaluate_Global_Dual_Mode performs global evaluations of configurations in dual modes. It may input in config, a set of basic configurations, and may output out_config, a configuration, and its adjusted cost. It may invoke Evaluate_Global_Config in both modes and then choose a lower cost config as output-config.

Apply_Storage_Constraint applies the storage constraints. It inputs RankedBscVector, the array of basic configurations ranked in order of netbenefits, and storage_limit, the storage-constraint specified by the user. It outputs lim_config, a set of basic configurations that satisfy the storage-constraint, and adjcost_lim, the cost of this configuration. It may visit the basic configurations in the order of their netbenefits, and add them to lim_config_1 configuration if they fall within the available storage. The lim_config_1 configuration is next subjected to global evaluation in two modes. Then, the lowest-cost configuration from this process is stored in red_config_1 configuration.

Examining the sample methods described above for the optimal greedy algorithm yields certain observations. By way of illustration, a basic philosophy to divide the best bsc selection problem into two parts emerges. Phase one includes creating a superset by selecting and ranking based on the net benefit (e.g., a measure of the aggregate improvement less costs), and phase two includes selecting basic configurations from the superset based on individual execution costs. The superset includes basic configurations that earned the right to be in the superset based on positive netbenefit.

By way of further illustration, the rationales for the heuristics used in creating the optimal superset can be discerned. For example, in phase one, the net benefit for each bsc is comparable to every other bsc because all basic configurations are evaluated against the same base configuration (e.g., the initial config). At the end of phase one, positive netbenefit basic configurations are moved into the good bsc set and not subsequently re-evaluated with respect to net benefits. Negative netbenefit basic configurations get a chance to increase their net benefit. If they become positive, they get to move into the good-bsc set.

Net benefits computed in phase two are not comparable to net benefits computed in phase one. For example, the net benefit of a bsc in phase two may exceed the net benefit of some, maybe even all basic configurations in phase one. In one example, basic configurations are ranked in descending net benefit order irrespective of whether the net benefit was found in phase one or phase two. While this may be comparing dissimilar items the comparison may be valid based on understanding net benefit from a certain point of view. For example, net benefit may be considered as a first derivative of a function the systems and methods seek to minimize. From this point of view, a more steep descent can be expected in phase one than in phase two. So for the most part, the netbenefits in phase two will be less than those of phase one. This line of reasoning can be extended to net benefits computed in subsequent rounds.

A second heuristic can also be uncovered. The second heuristic concerns using Evaluate_Global_Config( ) as a primitive to assist in the net benefit computation in the Eval_Bscs function. Consider:

Evaluate_Global_Config(base_config,NORMAL,adjcost_bc, reduced_base_config)

where base_config represents the good bsc set discovered so far. Not all basic configurations in the base_config are actually chosen by Evaluate_Global_Config( ). The function only picks a subset of the "good" bsc set, which is returned in the parameter 'reduced_base_config'. Consider the other invocation of Eval_Bscs in the function:

Evaluate_Global_Config(cprime, NORMAL, adjcost_cp, reduced_cprime)

In this function, the reduced_cprime configuration is formed from cprime, which includes the "base_config+ B", where B is the bsc under consideration. There is no guarantee that "reduced_cprime" and "reduced_base_config" differ only in the bsc B, even though the difference in the costs of their respective configurations is used as the net benefit value for B. Once again this is justified by the insight that the net benefit value is used as a measure of the usefulness of a bsc. The actual value is not as significant as whether the value is non-negative. If the netbenefit of the basic configuration is non-negative, the basic configuration gains admission to the candidate-pool from which the final selection is made.

The example methods also provide insights into the motivation for using dual modes in Evaluate_Global_Config. Evaluate_Global_Config plays an important role in optimal global greedy algorithms employed by example systems and methods. It is like a primitive function that is called repeatedly in different contexts. Its task is to quickly determine the best basic configurations to pick from a given set. It makes its decision solely on execution cost considerations in the NORMAL mode. However, in some edge-cases, it is possible that this basic configuration is not optimal and the RANKBASED mode will yield a lower-cost configuration. Thus, to make the example systems and methods more robust, the dual modes are included and the function can be invoked in both modes from various locations.

Thus, from the example methods, it can be seen that OptGG brings together several techniques and heuristics used in algorithm design to facilitate efficiently selecting access structures for large, complex workloads. In different examples the selection may produce good to optimal solutions. The heuristics employed facilitate scaling the example systems and methods.

The example elements uses the linear nature of a cost function to derive a net benefit concept. The net benefit concept drives an "optimal superset" construction phase that exploits the "separation of concerns" approach. In this first phase decision making is based on all three components of the cost function (e.g., the execution, creation and maintenance costs). In the next phase the choice of basic configurations is based solely on the execution cost criterion with each query greedily picking the available bsc based on the input criterion. In a third phase, storage constraints are considered after the superset computation. This reduces complexity. In one example, two different modes of ranking the basic configurations can be employed. One method is based on net benefit and the second method is based on a ratio of net benefit to storage.

FIG. 1 illustrates an example method 100 associated with selecting access structures. The illustrated elements denote "processing blocks" that may be implemented in logic. In one example, the processing blocks may represent executable instructions that cause a computer, processor, and/or logic device to respond, to perform an action(s), to change states, and/or to make decisions. Thus, the described methods can be implemented as processor executable instructions and/or operations provided by a computer-readable medium. In another example, the processing blocks may represent functions and/or actions performed by functionally equivalent circuits including an analog circuit, a digital signal processor circuit, an application specific integrated circuit (ASIC), or other logic device.

It will be appreciated that electronic and software applications may involve dynamic and flexible processes. Thus, illustrated blocks may be performed in sequences different than the one shown and/or blocks may be combined or separated into multiple components. Blocks may also be performed concurrently, substantially in parallel, and/or at substantially different points in time.

FIG. 1 illustrates a method 100 associated with selecting access structures to associate with a database. Method 100 may include, at 110, identifying a set of access structures that are configured to support members of a set of database queries. The access structures may include, for example, an index, and a materialized view.

Method 100 may also include, at 120, identifying a set of basic configurations from the set of access structures. A basic configuration may include, for example, an access structure(s) related to supporting a single database query.

Method 100 may also include, at 130, computing a net benefit for members of the set of basic configurations. In one example, the net benefit may be computed according to a formula (e.g., net_benefit (B, C)=Cost(C)−Cost(C')). In the formula, C'=configuration C with basic configuration B added.

Method 100 may also include, at 140, identifying a candidate configuration and an excluded configuration by selecting a member(s) of the set of basic configurations as a member(s) of the candidate configuration based, at least in part, on a net benefit of the member. The excluded configuration may include non-selected members of the set of basic configurations. In one example, a member of the set of basic configurations may be selected to be included in the candidate configuration when the net benefit for the member exceeds a standalone net benefit threshold. For example, the standalone net benefit threshold may require a basic configuration to have a positive net benefit, to be in the top 10% of net benefits, and so on.

Method 100 may also include, at 150, producing a reduced configuration by selectively moving basic configurations from the candidate configuration to the excluded configuration based on an execution cost. The execution cost may reflect the amount of processor time consumed by a query when supported by a selected basic configuration. In one example, producing a reduced configuration includes moving a basic configuration with a lowest execution cost for a query from the candidate configuration to the reduced configuration and moving other basic configurations not having the lowest execution cost for the query to the excluded configuration. Thus, a greedy algorithmic approach may be employed to minimize the execution cost for each query.

Method 100 may also include, at 160, manipulating the reduced configuration by selectively moving a basic configuration(s) from the excluded configuration to the reduced configuration based on a shared cost. The shared cost may reflect creation costs and/or maintenance costs that may be distributed between included basic configurations. In one example, a basic configuration may be moved from the excluded configuration to the reduced configuration when the net benefit of the basic configuration exceeds an in-context net benefit threshold when the net benefit of the basic configuration is viewed in light of a cost(s) shared with a basic configuration(s) in the reduced configuration.

At 170, a determination may be made concerning whether further improvements can be made to an overall measure for the reduced configuration. For example, a determination may be made concerning whether overall execution cost can be reduced, whether overall resource consumption can be reduced, whether a ratio of execution cost to resource consumption can be improved, and so on. If the determination at 170 is yes, then processing may return to 160 where further manipulations may occur.

Method 100 may also include selectively moving one or more basic configurations between a reduced configuration and an excluded configuration based on a basic configuration resource requirement. The resource requirement may concern, for example, memory consumed, processor cycles consumed, disk space, and so on. Considering resource consumption facilitates further manipulating a reduced configuration. For example, a basic configuration may be moved from the reduced configuration to the excluded configuration when the resource requirement for the basic configuration exceeds a standalone resource consumption threshold. Similarly, a basic configuration may be moved from the reduced configuration to the excluded configuration when the resource requirement for the basic configuration exceeds an in-context resource consumption threshold when viewed in light of an execution cost for the basic configuration. By way of illustration, a basic configuration that consumes excessive memory may be removed from the reduced configuration and a less memory intensive basic configuration added.

In other examples, a basic configuration may be moved from the excluded configuration to the reduced configuration when the resource requirement for the basic configuration falls below the standalone resource consumption threshold.

Additionally, a basic configuration may be moved from the excluded configuration to the reduced configuration when the resource requirement for the basic configuration falls below the in-context resource consumption threshold when viewed in light of an execution cost for the basic configuration.

While FIG. 1 illustrates various actions occurring in serial, it is to be appreciated that various actions illustrated in FIG. 1 could occur substantially in parallel. By way of illustration, a first process could identify access structures and basic configurations, a second process could compute net benefits, a third process could identify the candidate configuration and excluded configuration, and a fourth process could identify and manipulate a reduced configuration. While four processes are described, it is to be appreciated that a greater and/or lesser number of processes could be employed and that lightweight processes, regular processes, threads, and other approaches could be employed.

In one example, methods are implemented as processor executable instructions and/or operations stored on a computer-readable medium. Thus, in one example, a computer-readable medium may store processor executable instructions operable to perform a method that includes identifying a set of access structures configured to support members of a set of database queries, identifying a set of basic configurations from the set of access structures, and computing a net benefit for members of the set of basic configurations. The method may also include identifying a candidate configuration and an excluded configuration by selecting members of the set of basic configurations as members of the candidate configuration. The selection may be based, for example, on a net benefit of a member of the set of basic configurations. Non-selected members of the set of basic configurations may be added to the excluded configuration. The method may also include producing a reduced configuration by selectively moving basic configurations from the candidate configuration to the excluded configuration based on an execution cost and manipulating the reduced configuration by selectively moving basic configurations from the excluded configuration to the reduced configuration based on a shared cost. While the above method is described being stored on a computer-readable medium, it is to be appreciated that other example methods described herein can also be stored on a computer-readable medium.

Figure 2:
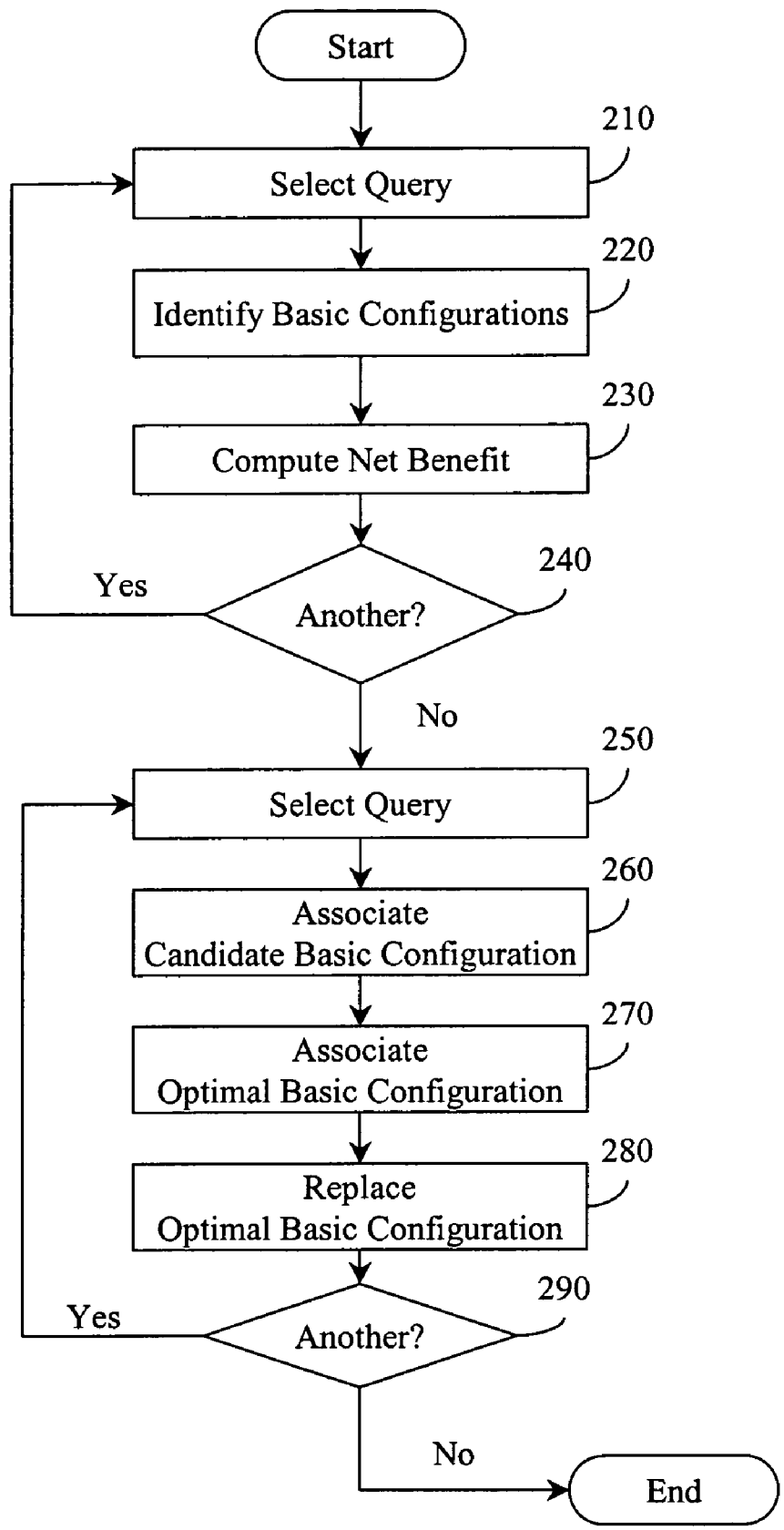
FIG. 2 illustrates another example method associated with selecting access structures.

In some examples, some actions described in FIGS. 1 and 2 may be performed by software developed from the example methods provided herein.

FIG. 2 illustrates a method 200 associated with selecting access structures. Method 200 is illustrated having two loops. The two loops facilitate processing a set of queries in a workload. The workload may be an actual workload and/or a theoretical workload. For example, the workload may include a set of actual queries, a recorded set of ad hoc queries, a set of hypothetical queries, a set of planned queries, and so on. Thus, the first loop includes actions at 210, 220, and 230 and the second loop includes actions at 250, 260, 270, and 280 that may facilitate analyzing each query in a workload.

In the first loop, method 200 may include, at 210, selecting a query for which access structures and basic configurations will be identified. The access structures may include, for example, an index, a materialized view, and a summary. Thus, method 200 may also include, at 220, identifying a basic configuration(s) of access structures that will support processing the selected query.

Method 200 may also include, at 230, computing net benefits for basic configurations associated with the query. In one example, the net benefit may be computed according to a formula (e.g., net_benefit (B, C)=Cost(C)−Cost(C')). In the formula, C'=configuration C with basic configuration B added.

At 240, a determination is made concerning whether every query has been analyzed. If there is another query to analyze, processing may return to 210, otherwise processing may proceed to 250. Thus, after 240, each query has been analyzed and access structures and basic configurations have been identified to support the queries. A net benefit measurement has been associated with each configuration. In one example, the basic configurations may be sorted, collectively and/or per query, on net benefit. An execution cost may also be known for each query as supported by each basic configuration.

In the second loop, method 200 may include, at 250, selecting a query for which access structures will be analyzed and selected. Method 200 may include, at 260, associating with a query a candidate basic configuration(s) selected from the available basic configurations generated in the first loop. The association may be based, at least in part, on net benefits computed for the basic configurations. For example, the N best basic configurations for a query with respect to net benefit may be associated with a query (N being an integer).

Method 200 may also include, at 270, associating with a query one optimal basic configuration selected from the candidate basic configurations associated with the query. The one optimal basic configuration selection may be based, at least in part, on an execution cost. For example, a greedy algorithmic approach may be taken and the basic configuration with the lowest execution cost may be selected. The execution cost may describe, for example, a number of processor cycles required to process a query as supported by a basic configuration.

Method 200 may also include, at 280, selectively replacing the one optimal basic configuration based, at least in part, on a shared cost. The shared cost may describe, for example, an amount of a resource required to support a basic configuration when at least a portion of the resource supports at least one other basic configuration. While the greedy algorithm may have initially minimized a cost function on execution time, the cost function may be further minimized by evaluating execution time in light of maintenance costs, creation costs, and resource consumption.

At 290, a determination may be made concerning whether there is another query to process. If the determination is yes, then processing may return to 250, otherwise processing may conclude.

In one example, method 200 may also consider resource requirements when selecting basic configurations to support a workload. Thus, method 200 may also include replacing a basic configuration based on a resource requirement.

In one example, action 280 may be repeated until a termination condition is achieved. For example, method 200 may continue selectively replacing the one optimal basic configuration based on a resource requirement until no further resource efficiency can be achieved. Additionally, method 200 may continue selectively replacing optimal basic configurations associated with queries until no further improvement can be attained for the workload. The improvement may concern, for example, execution time, resource consumption, a ratio of execution efficiency to resource consumption efficiency, and so on.

Figure 3:
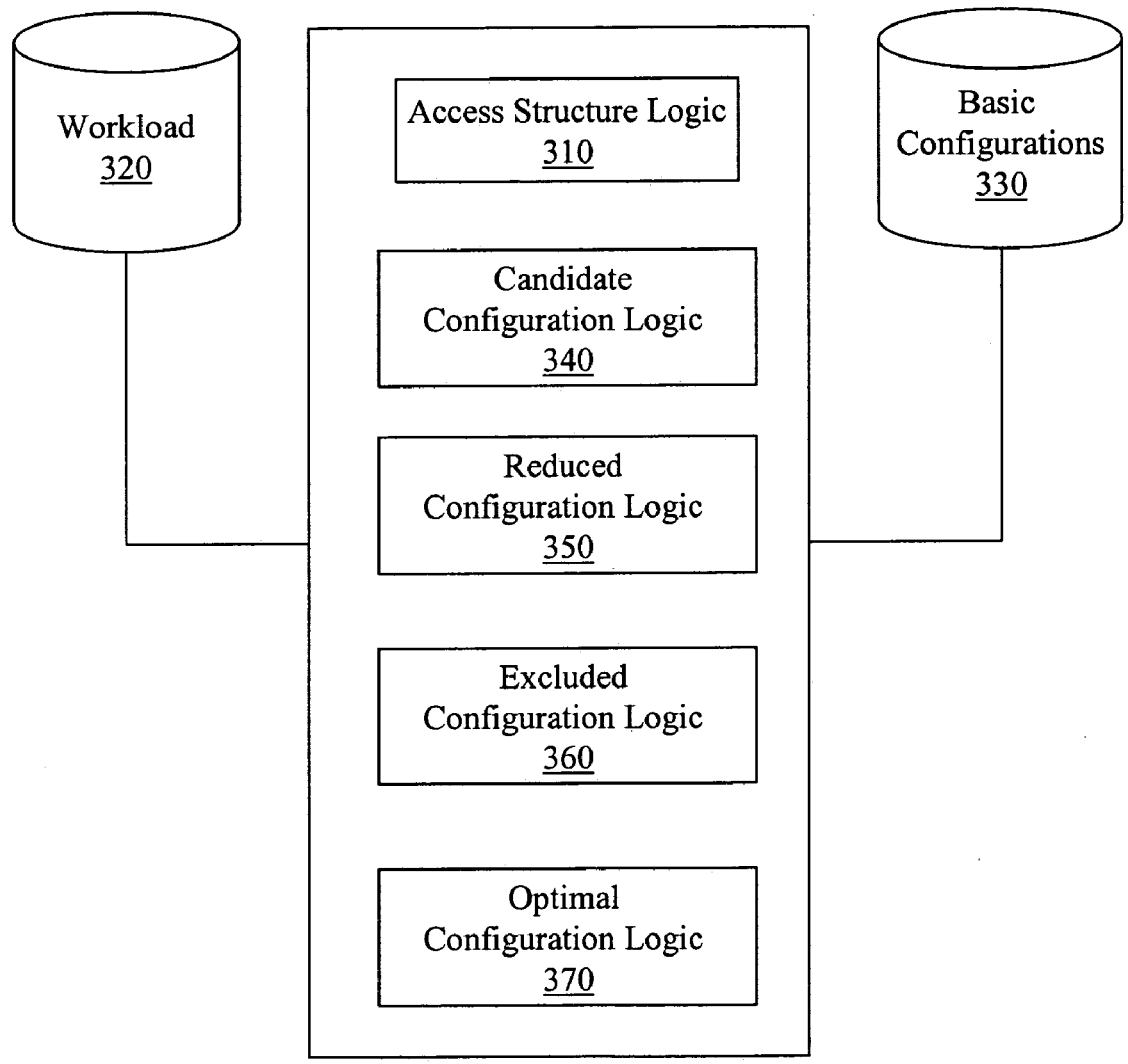
FIG. 3 illustrates an example system associated with selecting access structures.

FIG. 3 illustrates a system 300 associated with selecting access structures. System 300 may include an access structure logic 310. Access structure logic 310 may be configured to access a workload 320. Workload 320 may include, for example, a set of queries that may be processed by a database.

System 300 may be configured to facilitate improving an overall performance measure (e.g., execution time) for the database. Additionally, system 300 may be configured to improve the overall measure while adhering to some constraint (e.g., memory consumed). Thus, access structure logic 310 may analyze each query in workload 320. The analyzing may include identifying basic configurations of access structures to support processing the query and may include computing a net benefit for the basic configuration. The basic configurations and net benefits may be stored, for example, in a data store 330.

Net benefit addresses an incremental value associated with adding a basic configuration to a configuration and thus facilitates answering the question of whether it makes sense to add a basic configuration to a configuration. The question may be analyzed in terms of return on investment (e.g., execution time improvement analyzed in light of creation and maintenance costs) and/or may be analyzed in terms of cost of investment (e.g., execution time improvement analyzed in light of resources consumed (e.g., memory)).

System 300 may also include a candidate configuration logic 340 that is configured to associate with each query in workload 320 basic configurations having a desired net benefit associated with processing the query. For example, basic configurations with positive net benefits, basic configurations whose net benefit ranks in the top half of a set of possible basic configurations, basic configurations whose net benefit exceeds a threshold (e.g., positive and one standard deviation above average), and so on may be chosen.

System 300 may also include a reduced configuration logic 350 that is configured to disassociate from each query in the workload basic configurations that do not have the lowest execution cost associated with processing the query. Thus a greedy algorithmic approach may be taken and only the basic configuration with the best execution time may be left associated with a query. However, processing may not be complete at this point in time. For example, a basic configuration that was previously excluded because its net benefit was too low when viewed in isolation may turn out to be an acceptable basic configuration when viewed in the context of other basic configurations that were chosen. For example, a basic configuration may share access structures with other basic configurations. However, its creation cost and/or maintenance cost may have been evaluated as being only attributable to that basic configuration. When viewed in context, the creation cost and/or maintenance cost may be amortized over a set of included basic configurations. This amortization may facilitate increasing the basic configuration net benefit above a threshold.

System 300 may also include an excluded configuration logic 360 that is configured to create an excluded set of basic configurations. Rather than simply discard initially non-selected basic configurations, these initially sub-par configurations may be retained for subsequent analysis. For example, an excluded basic configuration not having a desired net benefit associated with processing a query and not having the lowest execution cost associated with processing a query may still be beneficial to a configuration when viewed in context with other selected basic configurations.

System 300 may also include an optimal configuration logic 370 that is configured to selectively associate with the query an additional basic configuration based on a shared cost net benefit.

Figure 4:
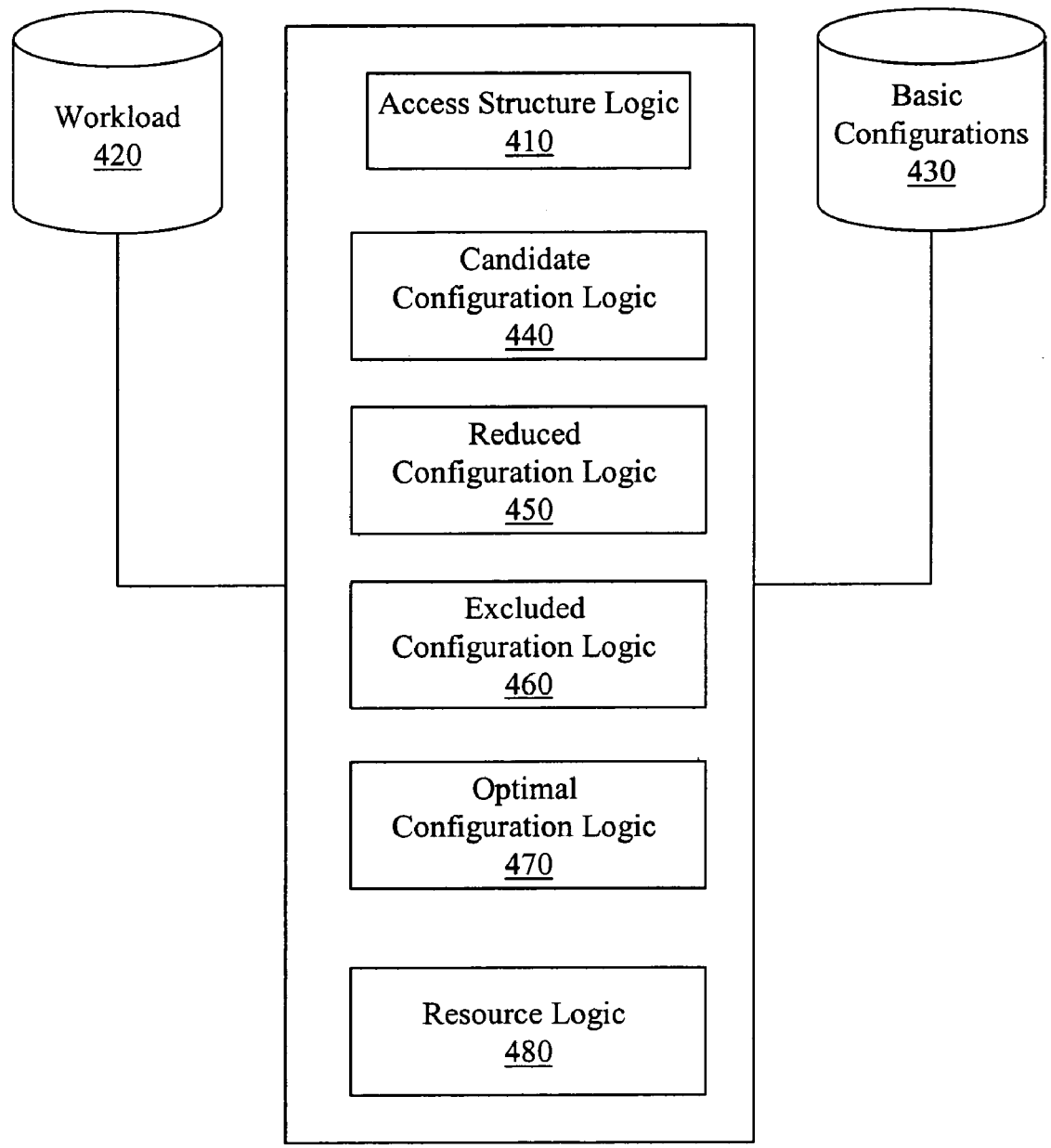
FIG. 4 illustrates another example system associated with selecting access structures.

FIG. 4 illustrates a system 400 associated with selecting access structures. System 400 includes several components similar to those described in connection with FIG. 3. For example, system 400 includes an access structure logic 410, a candidate configuration logic 440, a reduced configuration logic 450, an excluded configuration logic 460, and an optimal configuration logic 470. However, system 400 also includes an additional component, resource logic 480.

Resource logic 480 may be configured to selectively disassociate a basic configuration from a query. For example, a query selected using an initially greedy algorithm, (e.g., query having lowest execution cost) may be disassociated from a query. Furthermore, resource logic 480 may be configured to associate a basic configuration from an excluded set of basic configurations with the query. The decisions to associate and disassociate may be based, for example, on a resource constraint net benefit. For example, a basic configuration with a fast execution time may have been selected by a greedy algorithm. However, to achieve the fast execution time the basic configuration may have to consume an undesired amount of resources. Thus, resource logic 480 may substitute a basic configuration that will yield a slower execution time but which may consume less resources based, for example, on satisfying an execution time to resource consumption threshold. The ratio of resource consumption to execution time may be, for example, a user configurable parameter.

Figure 5:
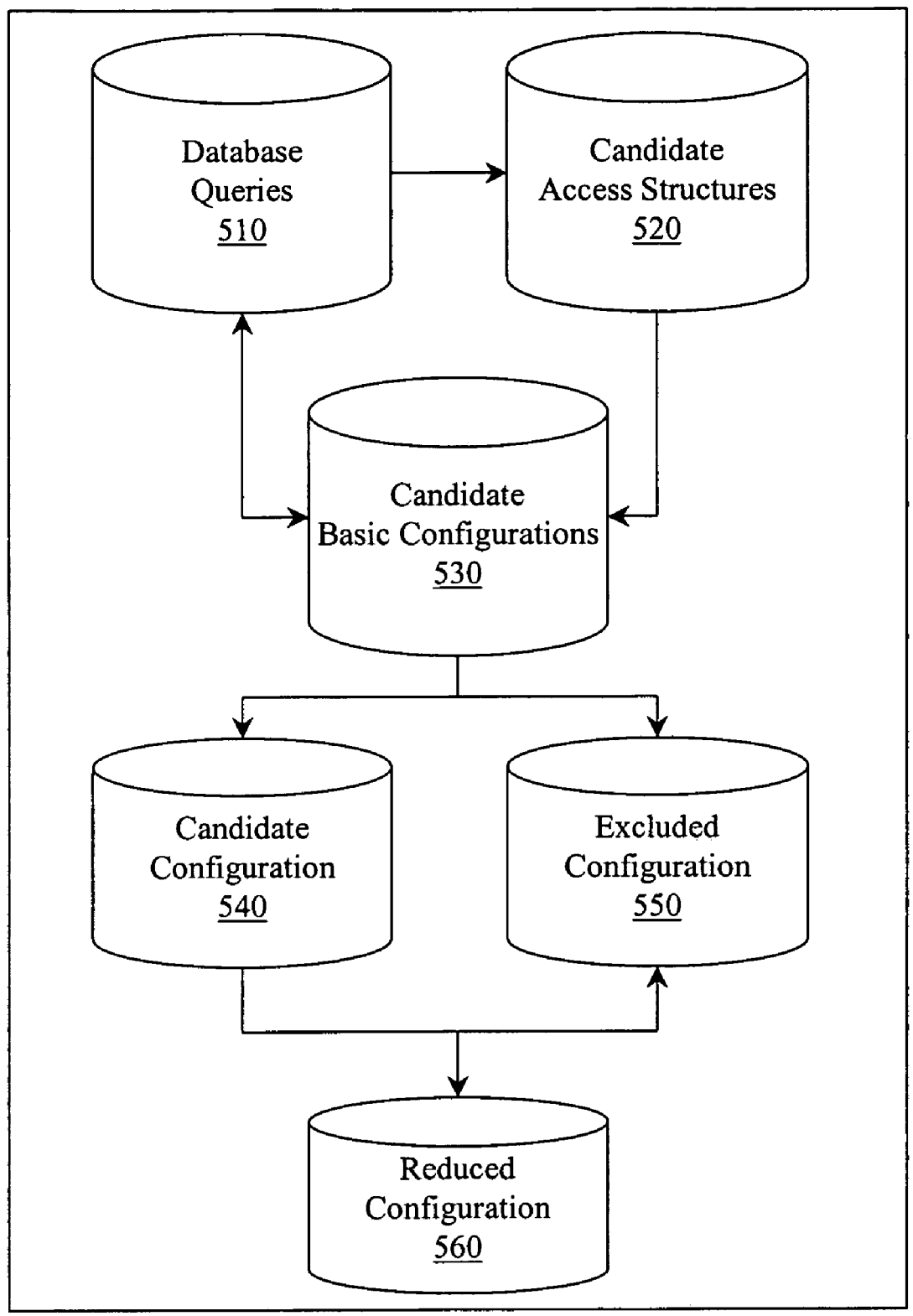
FIG. 5 illustrates an example data flow associated with selecting access structures.

FIG. 5 illustrates an example data flow 500 associated with selecting access structures to support database queries. Queries may be stored in a query data store 510. Access structures to support the queries may be stored in a candidate access structure data store 520. There may be a many to many relationship between queries and access structures. For example, an access structure (e.g., index) may support many queries and a query may be supported by many access structures.

Candidate basic configurations may be stored in a candidate basic configuration data store 530. There may be a many to many relationship between access structures and basic configurations. For example, a basic configuration may include multiple access structures and an access structure may be included in multiple basic configurations.

From the complete set of basic configurations that may support queries, two configurations (e.g., sets of basic configurations) may be formed. The first set may be referred to as a candidate configuration while the second set may be referred to as an excluded configuration. Basic configurations may be moved between these sets during processing. The candidate configuration may be stored in a candidate configuration data store 540 and the excluded configuration may be stored in an excluded configuration data store 550.

A reduced configuration may be stored in reduced configuration data store 560. The reduced configuration may store selected basic configurations that facilitate maximizing a performance criteria while minimizing a resource criteria. The performance criteria may be, for example, query execution time. The resource criteria may be, for example, memory consumption. Thus, some basic configurations in the reduced configuration may have a net benefit that exceeds a threshold and may have the fastest execution time for a query. Other basic configurations in the reduced configuration may have a net benefit that exceeds a threshold when viewed in the context of other basic configurations in the reduced configuration. Additionally, some basic configurations may be included in the reduced configuration because a ratio between their net benefit and a resource consideration may exceed a threshold.

Figure 6:
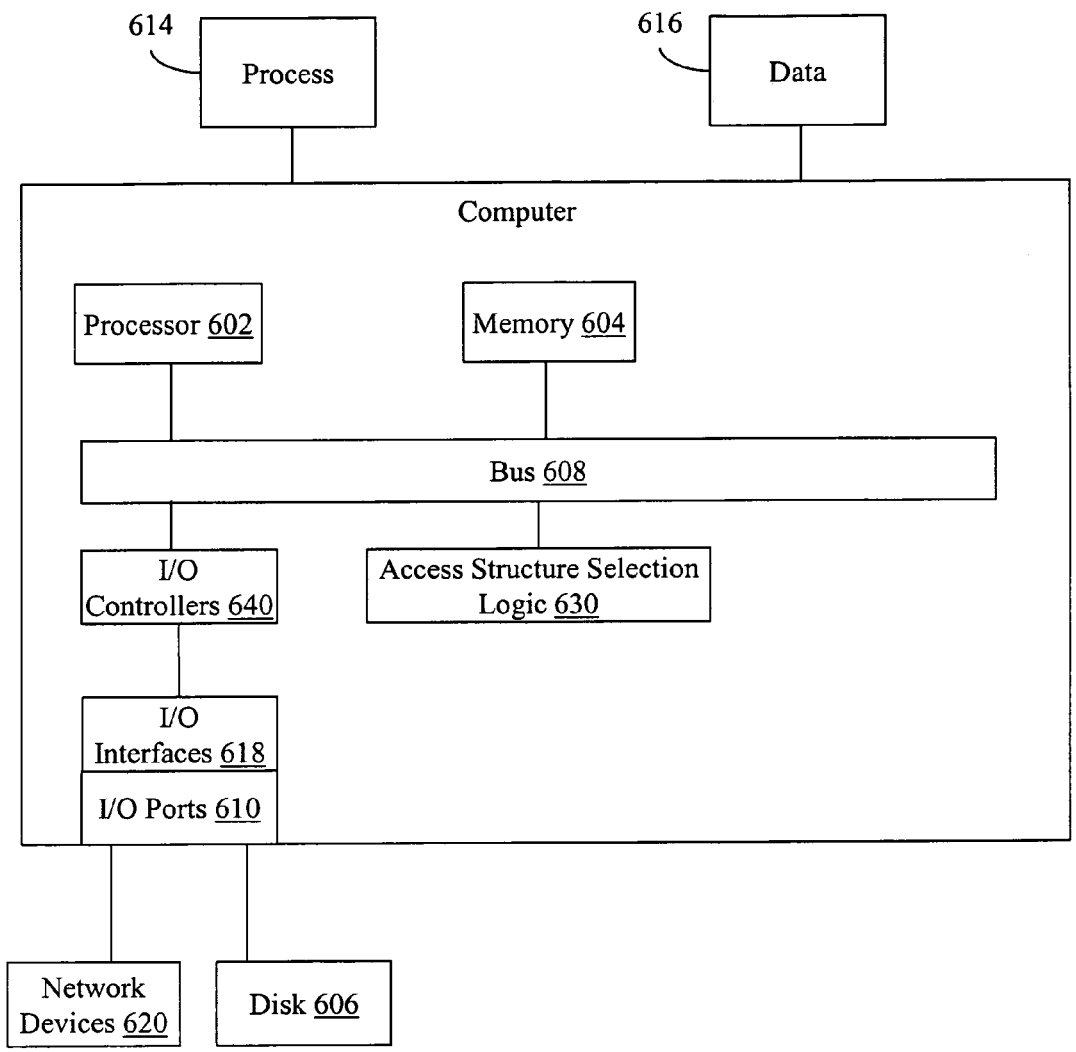
FIG. 6 illustrates an example computing environment in which example systems and methods illustrated herein can operate.

FIG. 6 illustrates an example computing device in which example systems and methods described herein, and equivalents, can operate. The example computing device may be a computer 600 that includes a processor 602, a memory 604, and input/output ports 610 operably connected by a bus 608. In one example, computer 600 may include an access structure selection logic 630 configured to facilitate selecting access structures to employ to support a workload. While access structure selection logic 630 is illustrated as a hardware component operably connected to bus 608, it is to be appreciated that in one example access structure selection logic 630 may be implemented as software stored on disk 606, brought into memory 604 as a process 614, and executed by processor 602.

Access structure selection logic 630 may provide means (e.g., hardware, software, firmware) for identifying access structures to support database queries, means (e.g., hardware, software, firmware) for organizing access structures into a configuration, and means (e.g., hardware, software, firmware) for minimizing a cost function associated with the configuration while maximizing a performance associated with the configuration by selecting access structures to support the configuration.

Generally describing an example configuration of computer 600, processor 602 can be a variety of various processors including dual microprocessor and other multi-processor architectures. Memory 604 can include volatile memory and/or non-volatile memory. The non-volatile memory can include, but is not limited to, ROM, PROM, EPROM, EEPROM, and so on. Volatile memory can include, for example, RAM, synchronous RAM (SRAM), dynamic RAM (DRAM), synchronous DRAM (SDRAM), double data rate SDRAM (DDR SDRAM), and direct RAM bus RAM (DRRAM).

Disk 606 may be operably connected to computer 600 via, for example, an input/output interface (e.g., card, device) 618 and an input/output port 610. Disk 606 can include, but is not limited to, devices like a magnetic disk drive, a solid state disk drive, a floppy disk drive, a tape drive, a Zip drive, a flash memory card, and/or a memory stick. Furthermore, disk 606 can include optical drives like a CD-ROM, a CD recordable drive (CD-R drive), a CD rewriteable drive (CD-RW drive), and/or a digital video ROM drive (DVD ROM). Memory 604 can store processes 614 and/or data 616, for example. Disk 606 and/or memory 604 can store an operating system that controls and allocates resources of computer 600.

Bus 608 can be a single internal bus interconnect architecture and/or other bus or mesh architectures. While a single bus is illustrated, it is to be appreciated that computer 600 may communicate with various devices, logics, and peripherals using other busses that are not illustrated (e.g., PCIE, SATA, Infiniband, 1394, USB, Ethernet). Bus 608 can be of a variety of types including, but not limited to, a memory bus or memory controller, a peripheral bus or external bus, a crossbar switch, and/or a local bus. The local bus can be of varieties including, but not limited to, an industrial standard architecture (ISA) bus, a microchannel architecture (MSA) bus, an extended ISA (EISA) bus, a peripheral component interconnect (PCI) bus, a universal serial (USB) bus, and a small computer systems interface (SCSI) bus.

Computer 600 may interact with input/output devices via i/o interfaces 618 and input/output ports 610. Input/output devices can include, but are not limited to, a keyboard, a microphone, a pointing and selection device, cameras, video cards, displays, disk 606, network devices 620, and so on. Input/output ports 610 can include but are not limited to, serial ports, parallel ports, and USB ports.

Computer 600 can operate in a network environment and thus may be connected to network devices 620 via the i/o devices 618, and/or the i/o ports 610. Through network devices 620, computer 600 may interact with a network. Through the network, computer 600 may be logically connected to remote computers. The networks with which computer 600 may interact include, but are not limited to, a local area network (LAN), a wide area network (WAN), and other networks. Network devices 620 can connect to LAN technologies including, but not limited to, fiber distributed data interface (FDDI), copper distributed data interface (CDDI), Ethernet (IEEE 802.3), token ring (IEEE 802.5), wireless computer communication (IEEE 802.11), Bluetooth (IEEE 802.15.1), and so on. Similarly, network devices 620 can connect to WAN technologies including, but not limited to, point to point links, circuit switching networks (e.g., integrated services digital networks (ISDN)), packet switching networks, and digital subscriber lines (DSL).

Figure 7:
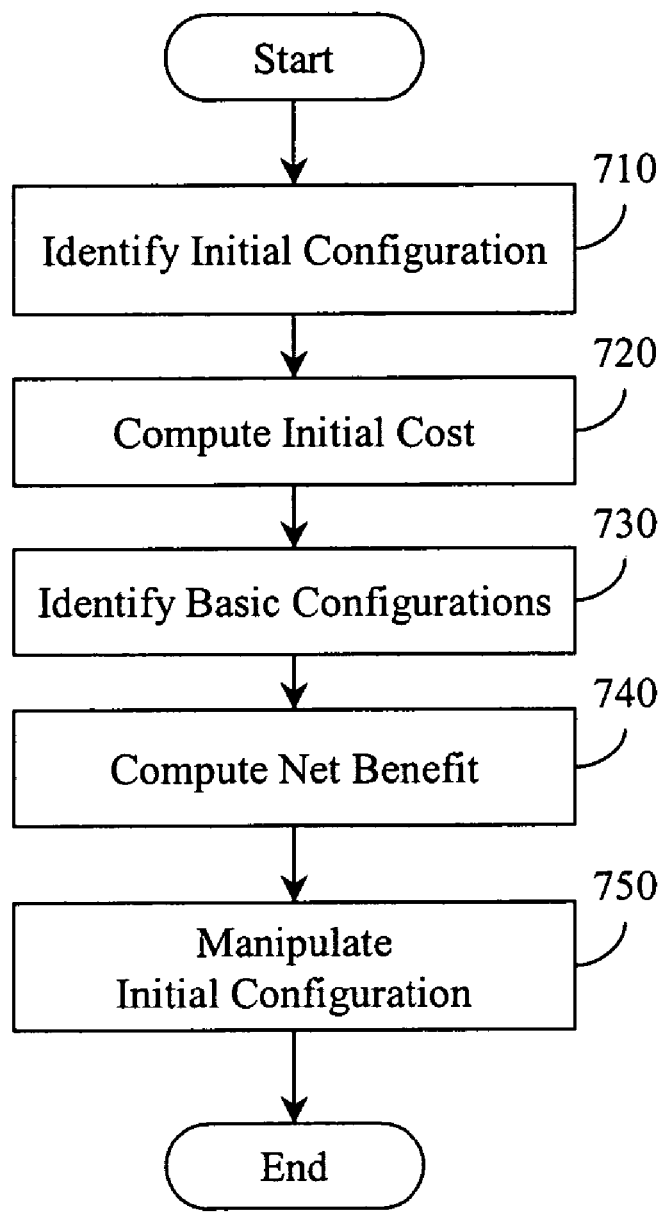
FIG. 7 illustrates an example method associated with a globally optimal and greedy heuristics based approach to access structure selection.

FIG. 7 illustrates an example method 700 associated with a globally optimal and greedy heuristics based approach to access structure selection. Method 700 may include, at 710, identifying an initial configuration (IC) of access structures configured to support members of workload of database queries. Method 700 may also include, at 720, computing an initial cost for the IC. In one example, the initial cost for IC includes evaluating $Cost(IC)=Exe(IC)+w_2*Maint(IC)$, where Exe(IC) is the sum-total of the execution costs of the queries in a workload using the basic configurations in IC, and Maint(IC) is the maintenance cost of the access-structures forming the basic configuration in IC.

Method 700 may also include, at 730, identifying a set of basic configurations that may be added to the IC and, at 740, computing a net benefit for as members of the set of basic configurations are added to the IC. In one example, the net benefit may be computed according to $net\_benefit(B, C)=Cost(C)-Cost(C')$, where: C'=configuration C with basic configuration B added to it.

Method 700 may also include, at 750, manipulating the IC into a final configuration by selectively adding basic configurations to the IC and by selectively removing basic configurations from the IC until a minimal cost for the final configuration is achieved. In one example, a cost for the final configuration is computed by evaluating $cost(C)=Exe(C)+W_1*Cre(C)+w_2*Maint(C)$, where Exe(C) is the sum-total of the execution-costs of queries in the workload using the basic configurations in configuration C, Cre(C) is the creation cost of the access-structures forming the basic configurations in configuration C, Maint(C) is the maintenance cost of the access structures forming the basic configurations in configuration C, $W_1$ is a creation cost weighting factor with respect to execution cost, and $w_2$ is a maintenance cost weighting factor with respect to the execution cost.

While example systems, methods, and so on have been illustrated by describing examples, and while the examples have been described in considerable detail, it is not the intention of the applicants to restrict or in any way limit the scope of the appended claims to such detail. It is, of course, not possible to describe every conceivable combination of components or methods for purposes of describing the systems, methods, and so on described herein. Additional advantages and modifications will readily appear to those skilled in the art. Therefore, the invention is not limited to the specific details, the representative apparatus, and illustrative examples shown and described. Thus, this application is intended to embrace alterations, modifications, and variations that fall within the scope of the appended claims. Furthermore, the preceding description is not meant to limit the scope of the invention. Rather, the scope of the invention is to be determined by the appended claims and their equivalents.

To the extent that the term "includes" or "including" is employed in the detailed description or the claims, it is intended to be inclusive in a manner similar to the term "comprising" as that term is interpreted when employed as a transitional word in a claim. Furthermore, to the extent that the term "or" is employed in the detailed description or claims (e.g., A or B) it is intended to mean "A or B or both". When the applicants intend to indicate "only A or B but not both" then the term "only A or B but not both" will be employed. Thus, use of the term "or" herein is the inclusive, and not the exclusive use. See, Bryan A. Garner, A Dictionary of Modern Legal Usage 624 (2d. Ed. 1995).

To the extent that the phrase "one or more of, A, B, and C" is employed herein, (e.g., a data store configured to store one or more of, A, B, and C) it is intended to convey the set of possibilities A, B, C, AB, AC, BC, and/or ABC (e.g., the data store may store only A, only B, only C, A&B, A&C, B&C, and/or A&B&C). It is not intended to require one of A, one of B, and one of C. When the applicants intend to indicate "at least one of A, at least one of B, and at least one of C", then the phrasing "at least one of A, at least one of B, and at least one of C" will be employed.

What is claimed is:

1. A computer-implemented method, comprising:
    identifying a set of access structures configured to support members of a set of database queries;
    identifying a set of basic configurations from the set of access structures;
    computing a net benefit associated with one or more members of the set of basic configurations;
    identifying a candidate configuration and an excluded configuration by selecting one or more members of the set of basic configurations as members of the candidate configuration based, at least in part, on a net benefit of a member of the set of basic configurations and adding non-selected members of the set of basic configurations to the excluded configuration;
    producing a reduced configuration by selectively moving one or more basic configurations from the candidate configuration to the excluded configuration based on an execution cost; and
    manipulating the reduced configuration by selectively moving one or more basic configurations from the excluded configuration to the reduced configuration based on a shared cost, where the shared cost is based on one, or more of, creations costs and maintenance costs that are distributed between basic configuration in the candidate configuration.

2. The method of claim 1, the access structures including one or more of, an index, and a materialized view.

3. The method of claim 1, a basic configuration comprising one or more access structures related to improving performance for a single database query.

4. The method of claim 1, a net benefit being computed according to:

net_benefit(B, C)=Cost(C)−Cost(C')

where:
    C'=configuration C with basic configuration B added.

5. The method of claim 4, a member of the set of basic configurations being selected for inclusion in the candidate configuration when the net benefit associated with the member exceeds a standalone net benefit threshold.

6. The method of claim 1, where producing a reduced configuration includes moving a basic configuration with a lowest execution cost for a query from the candidate configuration to the reduced configuration and moving other basic configurations not having the lowest execution cost for the query to the excluded configuration.

7. The method of claim 1, where a basic configuration is moved from the excluded configuration to the reduced configuration when the net benefit of the basic configuration exceeds an in-context net benefit threshold when the net benefit of the basic configuration is viewed in light of one or more costs shared with one or more basic configurations in the reduced configuration.

8. The method of claim 1, including selectively moving one or more basic configurations between the reduced configuration and the excluded configuration based on a basic configuration resource requirement concerning one or more of, memory consumed, processor cycles consumed, and disk space.

9. The method of claim 8, a basic configuration being moved from the reduced configuration to the excluded configuration when the resource requirement for the basic configuration exceeds a standalone resource consumption threshold.

10. The method of claim 9, a basic configuration being moved from the reduced configuration to the excluded configuration when the resource requirement for the basic configuration exceeds an in-context resource consumption threshold when viewed in light of an execution cost for the basic configuration, and
    a basic configuration being moved from the excluded configuration to the reduced configuration when the resource requirement for the basic configuration falls below the standalone resource consumption threshold.

11. The method of claim 10, a basic configuration being moved from the excluded configuration to the reduced configuration when the resource requirement for the basic configuration falls below the in-context resource consumption threshold when viewed in light of an execution cost for the basic configuration.

12. The method of claim 1, including manipulating the reduced configuration by selectively moving one or more basic configurations from the excluded configuration to the reduced configuration based on a shared cost until no further improvements to an overall cost for the reduced configuration can be made.

13. The method of claim 1, including selectively moving one or more basic configurations between the reduced configuration and the excluded configuration based on a basic configuration resource requirement until no further improvements to an overall cost for the reduced configuration can be made.

14. A computer-readable medium storing processor executable instructions operable to perform a method, the method comprising:
    identifying a set of access structures configured to support members of a set of database queries;
    identifying a set of basic configurations from the set of access structures;
    computing a net benefit associated with one or more members of the set of basic configurations;
    identifying a candidate configuration and an excluded configuration by selecting one or more members of the set of basic configurations as members of the candidate configuration based, at least in part, on a net benefit of a member of the set of basic configurations and adding non-selected members of the set of basic configurations to the excluded configuration;
    producing a reduced configuration by selectively moving one or more basic configurations from the candidate configuration to the excluded configuration based on an execution cost; and
    manipulating the reduced configuration by selectively moving one or more basic configurations from the excluded configuration to the reduced configuration based on a shared cost, where the shared cost is based on one more of, creations costs, and maintenance costs that are distributed between basic configuration in the candidate configuration.

15. A computer implemented method, comprising:
for each query in a workload:
identifying one or more basic configurations of access structures configured to support processing each of the query; and
computing a net benefit associated with each of the one or more basic configurations; and
for each query in the workload:
associating with each of the query one or more candidate basic configurations selected from the one or more basic configurations based, at least in part, on the net benefits computed for the one or more basic configurations;
associating with each of the query one optimal basic configuration selected from the one or more candidate basic configurations associated with each of the query, the one optimal basic configuration being selected based, at least in part, on an execution cost; and
selectively replacing the one optimal basic configuration based, at least in part, on a shared cost, where the shared cost is based on one or more of, creations casts, and maintenance costs that are distributed between basic configurations in the workload.

16. The method of claim 15, including selectively replacing the one optimal basic configuration based, at least in part, on a resource requirement and
repetitively replacing optimal basic configurations associated with each of the queries until no further improvement can be attained for the workload.

17. The method of claim 16, the net benefit being computed according to:

net_benefit($B$, $C$)=Cost($C$)−Cost($C'$)

where: $C'$=configuration C with basic configuration B added.

18. The method of claim 17, the workload including one or more of, a set of actual queries, a recorded set of ad hoc queries, a set of hypothetical queries, and a set of planned queries.

19. The method of claim 18, including defining the execution cost to describe a number of processor cycles required to process a query as supported by a basic configuration.

20. The method of claim 19, including defining the shared cost to describe an amount of a resource required to support a basic configuration, at least a portion of the amount of the resource supporting at least one other basic configuration, the resource being one or more of, memory, processor cycles, and disk space.

21. A system, comprising:
an access structure logic configured:
to access a workload and for each query in the workload:
to identify a basic configuration of access structures to support processing the query; and
to compute a net benefit for the basic configuration;
a candidate configuration logic configured to associate with each query in the workload one or more basic configurations having a desired net benefit associated with processing the query;
a reduced configuration logic configured to disassociate from each query in the workload one or more basic configurations not having the lowest execution cost associated with processing the query;
an excluded configuration logic configured to create an excluded set of basic configurations, an excluded basic configuration not having a desired net benefit associated with processing a query and not having the lowest execution cost associated with processing a query; and
an optimal configuration logic configured to selectively associate with the query an additional basic configuration based on a shared cost net benefit, where the shared cost net benefit is a sum of individual cost net benefits for basic configurations in a workload, and
where at least one of the access structure logic, the candidate configuration logic, the reduced configuration logic, the excluded configuration logic, and the optimal configuration logic are embodied on a computer-readable medium.

22. The system of claim 21, including a resource logic configured to selectively disassociate from a query a basic configuration having a lowest execution cost and to associate with a query a basic configuration from the excluded set of basic configurations, the decisions to associate and disassociate being based on a resource constraint net benefit.

23. A computer-implemented method, comprising:
identifying an initial configuration (IC) of access structures configured to support members of a workload of database queries;
computing an initial cost for the IC;
identifying a set of basic configurations that may be added to the IC;
computing a net benefit associated with one or more members of the set of basic configurations; and
manipulating the IC into a final configuration by selectively adding one or more basic configurations to the IC and by selectively removing one or more basic configurations for the IC until a minimal cost for the final configuration is achieved, where the minimal cost is based, at least in part, on creations costs, and maintenance costs that are distributed between basic configuration in the final configuration.

24. The method of claim 23, where computing an initial cost for the IC includes evaluating:

Cost($IC$)=Exe($IC$)+$w_2$*Maint($IC$);

where
Exe(IC) is the sum-total of the execution costs of the queries in a workload using the basic configurations in IC;
Maint(IC) is the maintenance cost of the access-structures forming the basic configuration in IC; and
$w_2$ is a maintanence cost weighting factor with respect to the execution costs.

25. The method of claim 24, where a final cost for the final configuration (C) is computed by evaluating:

cost($C$)=Exe($C$)+$w_1$*Cre($C$)+$w_2$*Maint($C$)

where
Exe(C) is the sum-total of the execution-costs of queries in the workload using the basic configurations in final configuration C;
Cre(C) is the creation-cost of the access-structures forming the basic configurations in final configuration C;
Maint(C) is the maintenance-cost of the access-structures forming the basic configurations in final configuration C;
$w_1$ is a creation cost weighting factor with respect to execution cost; and
$w_2$ is a maintenance cost weighting factor with respect to the execution cost.

* * * * *

UNITED STATES PATENT AND TRADEMARK OFFICE
CERTIFICATE OF CORRECTION

PATENT NO.        : 7,475,068 B2                                          Page 1 of 1
APPLICATION NO.   : 11/266530
DATED             : January 6, 2009
INVENTOR(S)       : Ramakrishnan It is certified that error appears in the above-identified patent and that said Letters Patent is hereby corrected as shown below:

On Sheet 1 of 7, in "Figure 1", line 1, above Flowchart, insert -- 100 --.

On Sheet 2 of 7, in "Figure 2", line 1, above Flowchart, insert -- 200 --.

On Sheet 3 of 7, in "Figure 3", line 1, above Diagram, insert -- 300 --.

On Sheet 4 of 7, in "Figure 4", line 1, above Diagram, insert -- 400 --.

On Sheet 5 of 7, in "Figure 5", line 1, above Diagram, insert -- 500 --.

On Sheet 6 of 7, in "Box 604", in "Figure 6", line 1, after "Computer" insert -- 600 --.

On Sheet 7 of 7, in "Figure 7", line 1, above Flowchart, insert -- 700 --.

In column 7, line 11, delete "C'of" and insert -- C' of --, therefor.

In column 9, line 11, delete "base config," and insert -- base_config, --, therefor.

In column 9, line 44, delete "in config," and insert -- in_config, --, therefor.

In column 21, line 26, in Claim 15, delete "casts," and insert -- costs, --, therefor.

In column 22, line 37, in Claim 23, delete "configuration" and insert -- configurations --, therefor.

In column 22, line 48, in Claim 24, delete "maintanence" and insert -- maintenance --, therefor.

Signed and Sealed this

Fourth Day of May, 2010

David J. Kappos
*Director of the United States Patent and Trademark Office*